March 9, 1965 E. PASSERINI 3,172,599

DIDACTIC MULTIPLICATOR FOR ELEMENTARY MULTIPLICATIONS

Filed May 24, 1963

INVENTOR.
Elio Passerini
BY [signature]
Agent

United States Patent Office 3,172,599

Patented Mar. 9, 1965

3,172,599
DIDACTIC MULTIPLICATOR FOR ELEMENTARY MULTIPLICATIONS

Elio Passerini, Via Frescobaldi 7, Bologna, Italy

Filed May 24, 1963, Ser. No. 282,985
Claims priority, application Italy, May 29, 1962, 11,038/62
1 Claim. (Cl. 235—89)

The present invention relates to a multiplicator device suitable for reading the product of elementary multiplication tables having crossing arrays and columns. Known devices for reading a product of two numerals of elementary multiplication tables are generally of complicated construction and use.

It is an object of the present invention to provide a device for reading the product of elementary multiplications which is of simple construction and use, particularly in view of the young and inexperienced users the mentioned device is destined to serve.

It is still another object to provide a device for reading the product of elementary multiplications, which, for didactic purposes will recall the traditional use of the multiplication tables printed on the back of a great many exercise-books.

It is a further but not last object to provide a device for carrying out elementary multiplications allowing the pupil, or the user to see and control the factors of the product he is reading.

It is still another object to provide a device also permitting to carry out elementary divisions and which, for its structural simplicity is suitable to embody auxiliary didactic devices on its back.

These and still further objects are attained by the elementary multiplication device according to this invention, which is characterized in that it comprises a case member having at least one transparent wall, a sheet within said case body and having reproduced on one face thereof a multiplication table facing the inner surface of said transparent wall, a sliding strip slidable over the outer surface of said transparent wall, first guide means on said case member for sliding said sliding strip paraller to the columns of numbers of said multiplication table, a plurality of aligned apertures in said sliding strip suitable to be put in register with the numbers of an array of said multiplication table, an array of numbers reproduced near said aligned apertures and corresponding to the first array of factor numbers of the multiplication table, a slider on said sliding strip, second guide means on said strip for sliding said slider parallel to the arrays of the multiplication table, a first window, on said slider adapted to be put in register with any number of the array of number reproduced on said strip, a second window on said slider adapted to be put in register with any of said aligned apertures of said strip and didactic representations on that side of the case member which is opposite to the multiplication table.

Figures 1, 2:
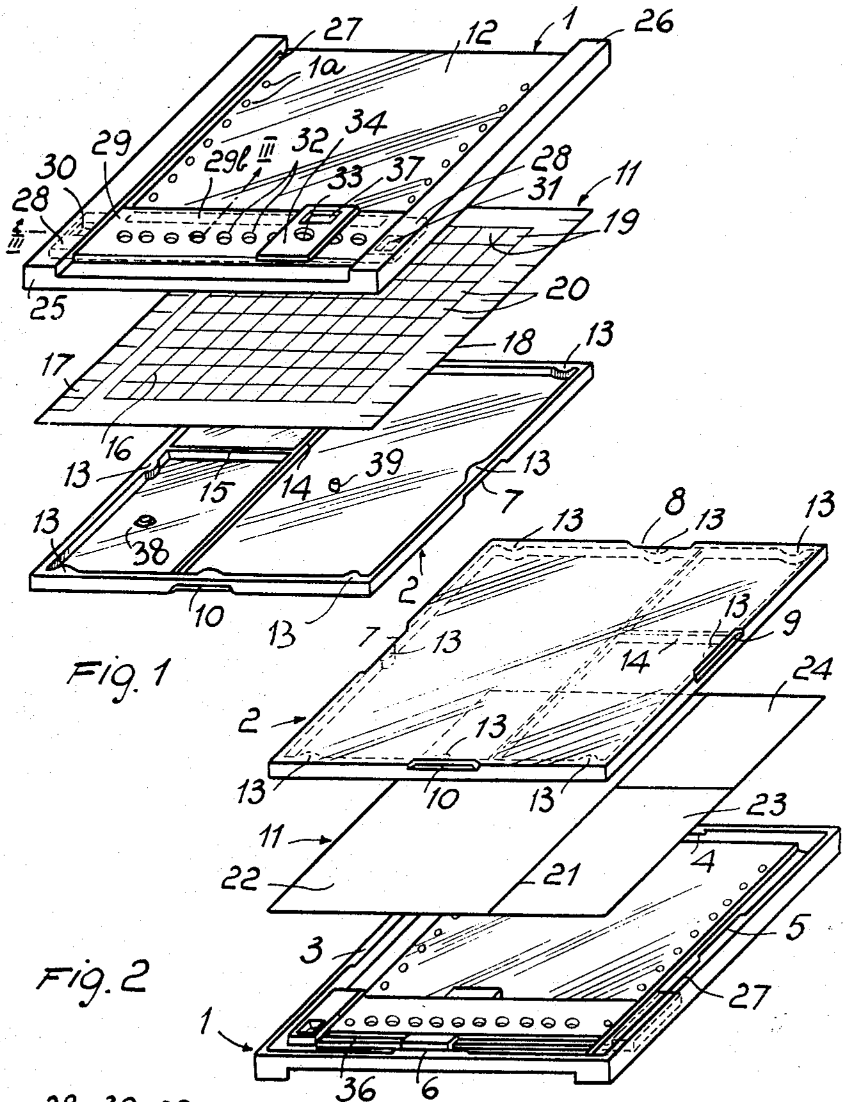
Figure 3:
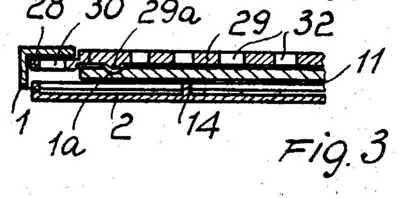
Figure 4:
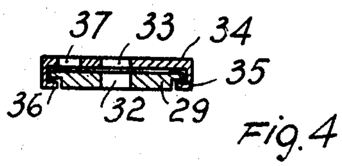

Further advantages and features of the invention will become more evident from the detailed description of a preferred, but not exclusive, embodiment of a multiplicator device, diagrammatically illustrated in the accompanying drawing, in which:

FIGURE 1 is an exploded perspective view of the elementary multiplication device, FIGURE 2 is an exploded perspective view of the multiplicator shown in FIGURE 1, the component elements of the same being seen from the opposite side with respect to the view of FIGURE 1, FIGURE 3 is a sectional view according to line III—III of FIGURE 1, of a multiplicator particularly showing the strip, slidable on the larger front face of the case body, and its guides, and FIGURE 4 is a cross-sectional view of the strip and slider engaged thereon.

Referring to the accompanying figures, in which the same numeral always designates the same element, there may be seen: an upper transparent case body 1, into which there is inserted a second transparent case body which is kept in position by little tongues 3, 4, 5 and 6 co-operating with the indentations 7, 8, 9, and 10, a cardboard 11 being clamped between the two case bodies so that the card board is maintained in contact with the lever face of the wall 12 of the upper case body by means of arcuated projections, generally indicated at 13, and ribs 14 and 15 provided on the lower case body; evidently the above case bodies provide a closed composite box member.

On the face 16 of the card board 11 inserted between the case-bodies 1 and 2, there is provided a column 17 with squares for numbers and a column 18 having a numerated scale, on the same card board face there are columns 19 and arrays 20 formed by the pigeon-holes, the columns and arrays crossing each other and forming a chequer.

On the other face 21 of the card board there are provided delimited areas 22, 23 and 24, on such areas being preferably represented geographic reproductions and figures and such areas correspond to the divisions presented by the lower case-body. It will be understood that, if the squares defining the arrays and columns are numerated according to progressions corresponding to elementary multiplications, each squares corresponding to the intersection of an array and a column will show the product of the numerals indicated at the beginning of the intersecting column and array which squares form the first column and the first array of the checker.

In the wall 12 of the upper case-body near two opposite parallel edges 25 and 26 thereof there are provided indentations, generally indicated with 1*a*. The edges 25 and 26 are made in the form of hollow ledges slightly projecting from wall 12 and having laterally each an aperture 27 (only one of which shown in figures) allowing the ends 28 and 28*a* of a sliding strip 29 to enter and be guided within said apertures; it is clear that the sliding strip 29 defines a co-ordinate on the plane of the case body. On the above mentioned sliding strip there are spherical projections 29*a* (only one of which shown in FIG. 3) and apertures 30 and 31 adapted to allow vision of a numerals and preferably centimetrical graduations located in the columns at the card board sides and obviously visible owing to the transparency, while the spherical projections of the sliding strip are adapted to define rest positions in co-operation with the indentations 1*a* formed in the case body. Said strip 29 has also aligned apertures, generally indicated at 32, and in register with the squares of the underlying card-board. Parallel to the array of the above apertures 32 there is an array 29*b* of numerals corresponding to the numerals of the first array of the card-board.

The numerals indicated on the array 29*b* of the strip 29 are adapted to be encircled one by one by a window 37, provided on a slider 34, slidable along guide edges 35 and 36 provided on the strip 29. The above slider presents a second window 33, which is adapted to allow vision of one of the numerals of the crossing arrays and columns printed on the card-board; evidently said slider is adapted to define a second co-ordinate which is necessary for identification of a point on the plane of the upper face of the case body 1 and thus one of the numerals printed on the card-board.

In spaces or areas defined by the ribs of the lower case body 2 there are small movable discs 38 and 39 adapted to establish correspondence among figures printed out on the card-board face facing the lower face of the case body.

Such discs 38 and 39 are used as indexes and are free to move between the card-board and the case-body 2 by a slight inclination of the device.

The operation is as follows: to find out the product of two numerals indicated in the first array and column of the chequer, the strip 29 is slided along its guides 25 and 26 until it is brought in a position in which through the first aperture 32 at the left end of the strip 29 in register with the first column of the left appears the first of the factor numbers, thence slider 34 is moved along strip 29 until in its window 37 the second factor number appears; thus the product of the two numbers is read through the aperture 33 of the slider 34 which aperture will be exactly in register with one of the apertures 32 presented by the strip 29. The operation for moving disc indexes 38, 39 over the figures traced on the lower face of the card—board is as follows: supposing for example, that the figures represent two maps, one of which shows subdivision in districts of a territory and the other shows or indicates the chief towns of the districts, by suitable inclination of the device the first moving index is brought onto the area of one district and thence, by pressing with a finger the elastic wall of the case body 2 above said disc index the same is held in position and through further inclination, while the first disc is fixed the positioning relative to the second disc index is carried out by placing it over the chief town, of the district indicated by the first disc.

The little work necessary to achieve such correspondence between a district and its chief town will oven more impress in the pupil's memory the existing relationship. The third figure provided on the card-board may represent any other subject having any connection with the two preceding figures, such for example a compass-card, on which there may be or not a magnetic pointer, thus providing a compass.

The invention is subsceptible of various changes and modifications, all within the scope of the invention. Thus for instance, all numerical indications as well as the figures may be directly printed onto the several elements which make up the device; furthermore materials, sizes and shapes may be of any kind depending on the requirements.

What is claimed is:

A didactic multiplicator, comprising a first case member, a second case member in connected relationship with said first case member, indentation provided on both said case members for being connected together, a sheet between said case members and having reproduced on one face thereof a multiplication table, provided with arrays and columns of numbers, at least one of said first and second case members being provided with a transparent wall, said multiplication table facing the inner surface of said transparent wall, first guide means on one of said case members comprising two hollow ledges parallel to opposite edges of said case member, each of said ledges having a longitudinal lateral aperture, a sliding strip slidable over the outer surface of the said transparent wall parallel to the columns of numbers of said multiplication table, the ends of said strip being slidably engaged in said longitudinal apertures, a plurality of aligned apertures in said sliding strip suitable to be put in register with the numbers of an array of said multiplication table, an array of numbers being reproduced on said sliding strip near said aligned apertures and corresponding to the first factor numbers of the multiplication table, at least one end of said sliding strip engaged with said first guide means being provided with a further aperture to be put in register with a column of numbers reproduced on said sheet and corresponding to the second factor numbers of said multiplication table, notch means in said sliding strip and said case member over which said strip is sliding for removably maintaining said strip in register with the selected array of numbers of the multiplication table, a slider on said sliding strip, second guide means on said strip for sliding said slider parallel to the arrays of the multiplication table, a first window on said slider adapted to be put in register with any number of the array of numbers reproduced on said strip, a second window on said slider adapted to be put in register with any of said aligned apertures of said strip and with the multiplication table thereunder.

References Cited by the Examiner

UNITED STATES PATENTS

| | | | |
|---|---|---|---|
| 820,226 | 5/06 | Marckwordt | 235—89 |
| 1,495,435 | 5/24 | Pike | 235—89 |
| 1,527,663 | 2/25 | Beery | 235—89 |
| 1,540,895 | 6/25 | Moir | 235—89 |
| 2,656,618 | 10/53 | Pescatori | 235—89 |
| 3,013,720 | 12/61 | Steinkoenig | 235—78 |

FOREIGN PATENTS

| | | |
|---|---|---|
| 602,537 | 3/26 | France. |
| 412,888 | 2/46 | Italy. |

LEYLAND M. MARTIN, *Primary Examiner.*

LEO SMILOW, *Examiner.*